United States Patent [19]
Wetherbee

[11] 3,938,769
[45] Feb. 17, 1976

[54] BOTTLE HOLDER

[76] Inventor: Hyatt G. Wetherbee, 8 Elmwood Ave., Millbury, Mass. 01527

[22] Filed: Nov. 18, 1974

[21] Appl. No.: 524,444

Related U.S. Application Data

[63] Continuation of Ser. No. 366,530, June 4, 1973, abandoned, which is a continuation of Ser. No. 244,411, April 17, 1972, abandoned.

[52] U.S. Cl. .................. 248/312; 211/73; 222/181
[51] Int. Cl.² ................ A61M 27/00; A47G 29/00
[58] Field of Search ...... 248/311, 312, 300; 211/72, 211/73, 71, 75, 74, 88; 222/105, 181

[56] References Cited

UNITED STATES PATENTS

| | | | |
|---|---|---|---|
| 1,450,055 | 3/1923 | Trumbull | 222/105 |
| 2,592,467 | 4/1952 | Reeves | 211/88 X |
| 2,798,230 | 7/1957 | Febure et al. | 248/311 X |
| 3,281,016 | 10/1966 | Thompson | 222/105 X |

Primary Examiner—J. Franklin Foss
Attorney, Agent, or Firm—Norman S. Blodgett; Gerry A. Blodgett

[57] ABSTRACT

A frame for holding an animal feeding bottle; the frame and bottle can be hung in the animal cage.

5 Claims, 3 Drawing Figures

BOTTLE HOLDER

This is a continuation, of application Ser. No. 366,530 filed June 4, 1973 now abandoned, which in turn is a continuation of patent application Ser. No. 244,411 filed April 17, 1972, now abandoned.

BACKGROUND OF THE INVENTION

A popular way of providing liquid food for rodent-type animals is to suspend an inverted bottle of liquid within the cage. The bottle is provided with a capillary tube, from the end of which the animal can suck drops of liquid. Various frames or holders have been placed on the market to suspend the feed bottle. One problem has been that frames which hold the bottle firmly enough so that the animal could not dislodge it by curious contact, present difficulties for the keeper when he wishes to refill the bottle. Conversely, in a frame in which the bottle can be easily filled, the bottle can be dislodged and broken. Often, the frame has had sharp corners or open loops by which the animal could be harmed. In some cases, the bottle has no cap to permit it to be clamped in the bracket and difficulty has been experienced with these bottles falling out of the bracket. In some prior art frames the design was too expensive to construct commercially, not durable enough to last, or not visually pleasing enough. These and other difficulties experienced with the prior art devices have been obviated in a novel manner by the present invention.

It is, therefore, an outstanding object of the invention to provide a bottle holder by which a liquid feed bottle can be suspended within an animal cage.

Another object of this invention is the provision of a bottle holder which is simple and inexpensive to produce.

A further object of the present invention is the provision of a bottle which holds the bottle firmly even if it has no cap and does not release the bottle if the animal tampers with it.

It is another object of the instant invention to provide a bottle holder from which the bottle can easily be released by the keeper.

A still further object of the invention is the provision of a bottle holder from which sharp parts do not project into the animal cage.

It is a further object of the invention to provide a bottle holder which hides the bottle somewhat from the view of the animal.

With these and other objects in view, as will be apparent to those skilled in the art, the invention resides in the combination of parts set forth in the specification and covered by the claims appended hereto.

SUMMARY OF THE INVENTION

This invention involves a frame used to suspend an inverted feed bottle into a pet container.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
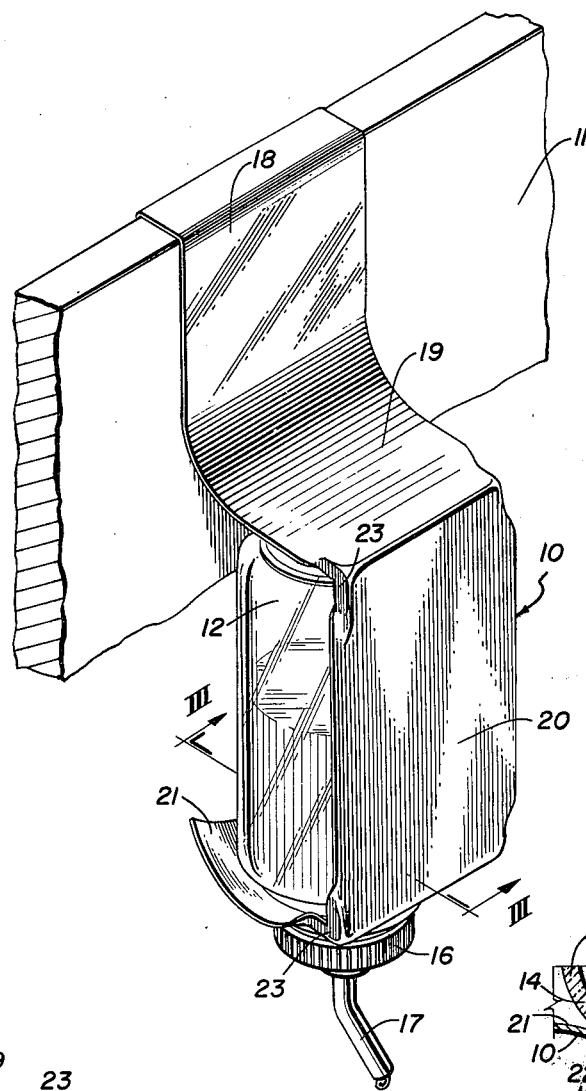
FIG. 1 shows a perspective view of the bottle holder incorporating the present invention.

Referring first to FIG. 1, wherein are best shown the general features of this invention, the frame 10 is shown attached to support 11 and is shown carrying a bottle 12. The support 11 is shown as the vertical wall of an animal cage. The bottle is shown to have a body 14, a neck 15 of diameter less than the body, a cap 16, and a tube 17 which allows drop by drop release of the contents of the bottle, when the bottle is inverted. By "inverted" is meant that the neck and cap of the bottle are directed downward as shown in the figures.

Figure 2:
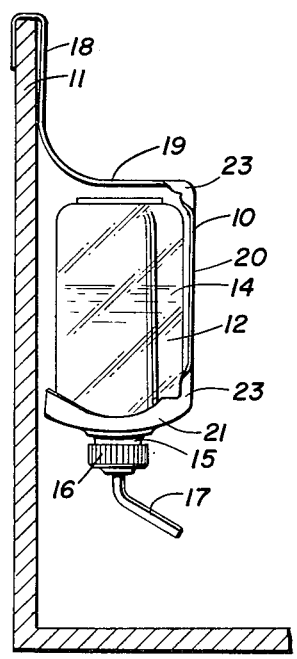
FIG. 2 shows a side elevation view of a bottle holder incorporating the present invention.

In the preferred embodiment, the frame 10 itself is fabricated from sheet metal. It could also be made of wire or of plastic. The upper portion 18 is shaped with a hook which allows the frame to be hung from the upper edge of the wall 11. A second portion 19 extends horizontally from the wall. A third portion 20 hangs vertically from the outboard end of the second portion. From the bottom of the third portion (and horizontally directed toward the wall is a fourth portion 21. The fourth portion is generally concave upwardly and has a centrally located aperture. As shown in FIGS. 1 and 2, the body 14 of the bottle rests within the volume defined by the frame 10 and the wall 11, and the neck 15 extends through the aperture and downwardly from the frame.

Figure 3:
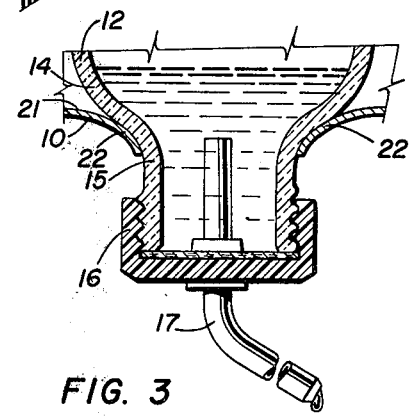
FIG. 3 shows a sectional view of the holder taken along line III-III.

FIG. 3 shows the manner by which the neck 15 of the bottle extends through the aperture. The aperture is shown to have a peripheral surface 22 which is in the shape of a downwardly directed nozzle with a somewhat parabolic shape. The diameter of the aperture is such that the neck of the bottle will pass through it, if the cap is not on the neck, but will not pass through it if the cap is in place. The tube 17 passes through the cap 16 and through an internal seal and allows drops of liquid to flow from the bottle. The contact of the peripheral surface 22 of the operture, with the body 14 of the bottle, causes the bottle to yield slightly to pressure, yet subsequent to return to its proper position. The corners of the frame are rounded to form webs 23. This makes the corners less dangerous and strengthens the frame.

The use and operation of the invention will now be readily understood in view of the above description. With the bottle and frame separated, the bottle is held neck upward and filled with liquid. The frame is held in a position inverse to that shown in the drawing, the neck of the bottle is placed through the aperture, and the cap is placed on the bottle. In those cases where the bottle has no cap to hold it in place in the aperture, the portion 20 acts to clamp the bottle against the wall 11, while the portion 19 clamps the bottle against the portion 21 and the socket formed by the surface 22 around the aperture. The resulting unit is inverted to the position shown in the Figures and then, hung from a suitable support in the pet container. The tube 17 then allows drops of liquid to form at its lower end and the liquid is thus made available to the pet. Reversal of the above procedure, allows refilling or replacement of the bottle.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by letters patent is:

1. A bottle holder for holding an animal-feeding bottle adjacent the plane of a horizontal support, comprising
   a. a first, substantially hook-shaped portion adapted to fix the holder to the support,
   b. a second portion extending generally horizontally from the first portion,
   c. a third portion extending downwardly from the second portion, so that said third portion is spaced from the plane of the support, and
   d. a fourth portion attached to said third portion, directed horizontally back toward the plane of the support, and adapted to carry an inverted bottle so that a substantial part of the bottle is held in a volume of space defined by the second, third, and fourth portions of the holder, and by the plane of the wall, the frame being stamped from a single sheet of metal, the bottle being provided with a neck of reduced diameter and a cap, an aperture being provided in the fourth portion through which the neck extends, the diameter of the aperture being such that the reduced neck without the cap can pass through said aperture, but cannot pass through with the cap in place, the frame being constructed of opaque sheet material and thus obscuring from view a large portion of the bottle.

2. A holder as recited in claim 1, wherein an angular junction between portions is provided with rounded corners.

3. A holder as recited in claim 1, wherein the aperture is nozzle-shaped and directed downwardly.

4. A holder as recited in claim 1, wherein the first, hook-shaped portion consists of a flat horizontal part of rectangular shape from one side of which extends a vertical part of rectangular shape whose lower edge is free and from the other side of which extends a vertical part of rectangular shape whose lower edge is connected to the said second portion of the frame, the first portion clamping to the horizontal support which is of rectangular cross-section, so that the horizontal part rest on a horizontal surface of the support and the two vertical parts press against opposite vertical surfaces of the support.

5. Bottle assembly, comprising
   a. a container arranged to be suspended vertically and to discharge its contents from the bottom,
   b. a first horizontal element extending across the upper portion of the bottle,
   c. a first vertical element extending upwardly from the said horizontal element in the plane of one side of the bottle,
   d. a second horizontal element extending from the upper end of the first vertical element and extending away from the bottle,
   e. a second vertical element extending downwardly from the second horizontal element in spaced, parallel relationship to the said first vertical element, and
   f. means for attaching the first horizontal element to the bottle.

* * * * *